(12) United States Patent
Oprea et al.

(10) Patent No.: US 12,722,500 B2
(45) Date of Patent: Sep. 1, 2026

(54) CONTROL OF A REGENERATIVE BRAKE FOR A MOTOR SYSTEM AND RELATED SYSTEMS, METHODS, AND DEVICES

(71) Applicant: Microchip Technology Incorporated, Chandler, AZ (US)

(72) Inventors: Sergiu Oprea, Bucharest (RO); Mihnea Rosu-Hamzescu, Bucharest (RO); Marius Dracea, Bucharest (RO)

(73) Assignee: Microchip Technology Incorporated, Chandler, AZ (US)

( * ) Notice: Subject to any disclaimer, the term of this patent is extended or adjusted under 35 U.S.C. 154(b) by 417 days.

(21) Appl. No.: 17/814,171

(22) Filed: Jul. 21, 2022

(65) Prior Publication Data

US 2023/0026306 A1 Jan. 26, 2023

Related U.S. Application Data

(60) Provisional application No. 63/203,412, filed on Jul. 21, 2021.

(51) Int. Cl.

| | |
|---|---|
| ***B60L 7/18*** | (2006.01) |
| ***H02P 21/13*** | (2006.01) |
| ***H02P 21/18*** | (2016.01) |
| ***H02P 21/22*** | (2016.01) |
| ***H02P 21/36*** | (2016.01) |

(52) U.S. Cl.

CPC ................ *B60L 7/18* (2013.01); *H02P 21/13* (2013.01); *H02P 21/18* (2016.02); *H02P 21/22* (2016.02); *H02P 21/36* (2016.02); *B60L 2240/421* (2013.01)

(58) Field of Classification Search

None

See application file for complete search history.

(56) References Cited

U.S. PATENT DOCUMENTS

| | | | | |
|---|---|---|---|---|
| 9,026,296 | B1 | 5/2015 | Johri et al. | |
| 2004/0122579 | A1 | 6/2004 | Ashizawa et al. | |
| 2008/0116842 | A1* | 5/2008 | Cheng ..................... | H02P 21/22 318/807 |
| 2012/0022735 | A1* | 1/2012 | Tashiro ..................... | B60L 7/18 701/22 |

(Continued)

FOREIGN PATENT DOCUMENTS

| | | |
|---|---|---|
| CN | 102481860 A | 5/2012 |
| CN | 106685304 A | 5/2017 |

(Continued)

OTHER PUBLICATIONS

International Search Report for International Application No. PCT/US2022/074025 mailed Nov. 10, 2022, 5 pages.

(Continued)

*Primary Examiner* — James J Lee
*Assistant Examiner* — Jonathan E Reinert
(74) *Attorney, Agent, or Firm* — TraskBritt

(57) ABSTRACT

A controller for a motor system includes an input terminal to receive a signal indicating a speed of an electric motor and a regenerative brake current interpolator to indicate a brake current to be applied to the electric motor responsive to the speed of the electric motor. Values of the brake current vary with variation of the speed of the electric motor.

21 Claims, 5 Drawing Sheets

(56) References Cited

U.S. PATENT DOCUMENTS

| | | | | |
|---|---|---|---|---|
| 2013/0296102 | A1* | 11/2013 | Banker | B60L 15/2009 180/65.265 |
| 2013/0297117 | A1 | 11/2013 | Lee et al. | |
| 2017/0129340 | A1* | 5/2017 | Murthy | H02P 21/36 |
| 2018/0212538 | A1 | 7/2018 | Lindberg et al. | |
| 2019/0168104 | A1 | 6/2019 | Doerksen et al. | |
| 2020/0195180 | A1* | 6/2020 | Li | H02P 21/06 |
| 2021/0091692 | A1* | 3/2021 | Lu | H02P 6/08 |
| 2021/0179165 | A1* | 6/2021 | Endo | B62D 5/046 |
| 2021/0213950 | A1 | 7/2021 | Books et al. | |

FOREIGN PATENT DOCUMENTS

| | | |
|---|---|---|
| CN | 107969125 A | 4/2018 |
| EP | 1480848 B1 | 4/2009 |

OTHER PUBLICATIONS

Written Opinion of the International Searching Authority for International Application No. PCT/US2022/074025 mailed Nov. 10, 2022, 6 pages.

First Office Action and Search Report of Chinese Patent Application No. 202280050412.9, issued Apr. 11, 2026, 25 pages with English translation.

* cited by examiner

CONTROL OF A REGENERATIVE BRAKE FOR A MOTOR SYSTEM AND RELATED SYSTEMS, METHODS, AND DEVICES

CROSS-REFERENCE TO RELATED APPLICATION

This application claims the benefit under 35 U.S.C. § 119(e) of U.S. Provisional Patent Application Ser. No. 63/203,412, filed Jul. 21, 2021, entitled "CONTROL OF A REGENERATIVE BRAKE FOR A MOTOR SYSTEM AND RELATED SYSTEMS, METHODS, AND DEVICES," the disclosure of which is hereby incorporated herein in its entirety by this reference.

TECHNICAL FIELD

This disclosure relates generally to a regenerative brake for low-power electric mobility (e-mobility) applications, and more specifically to the use of dynamic regenerative brake currents corresponding to regenerative brakes for low-power e-mobility applications.

BACKGROUND

Modern e-mobility solutions aim to increase efficiency to improve battery life, reduce operating noise, and provide a comfortable riding experience.

BRIEF DESCRIPTION OF THE DRAWINGS

While this disclosure concludes with claims particularly pointing out and distinctly claiming specific examples, various features and advantages of examples within the scope of this disclosure may be more readily ascertained from the following description when read in conjunction with the accompanying drawings, in which:

DETAILED DESCRIPTION

Figure 1:
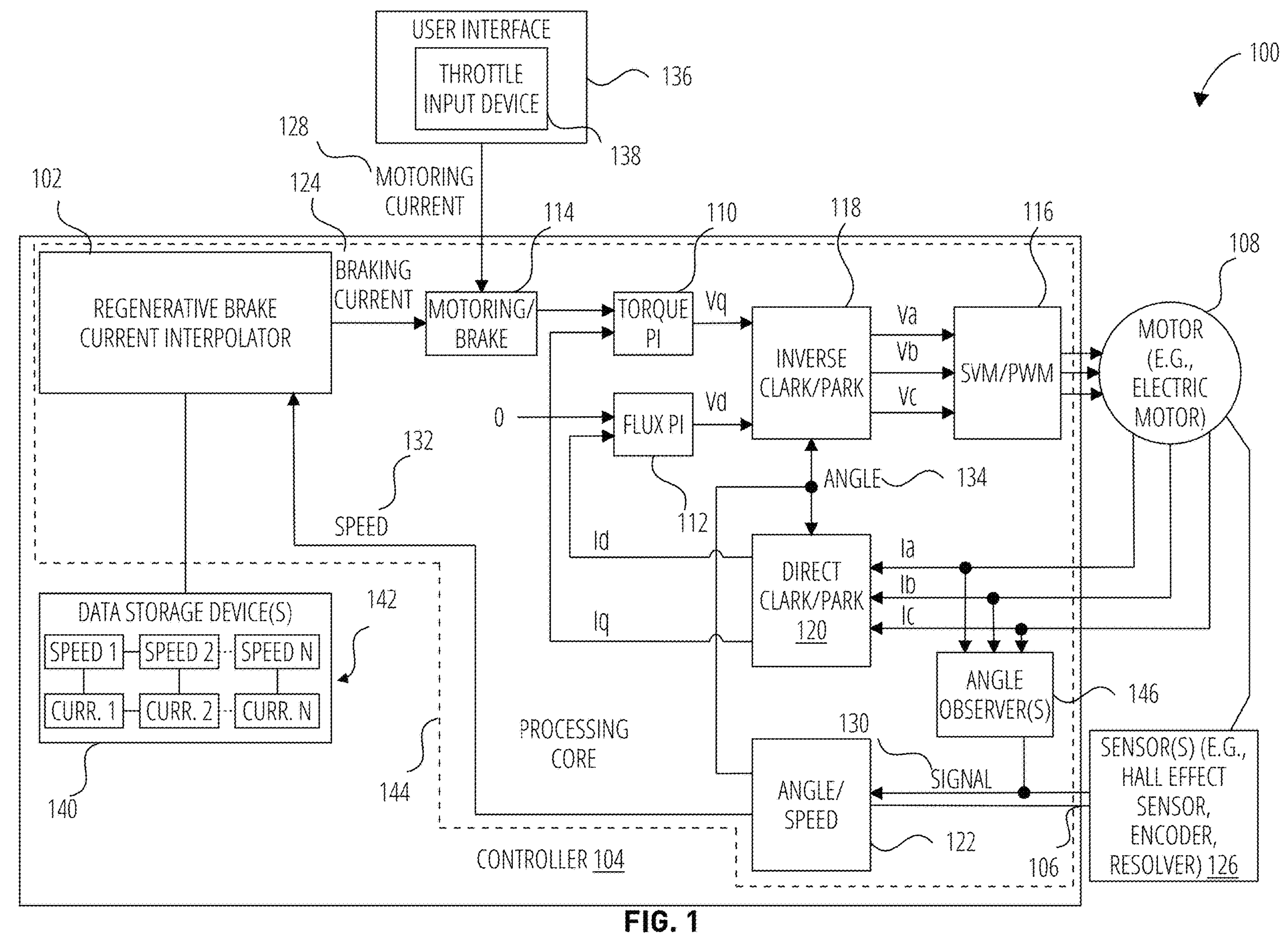
FIG. 1 is a functional flow diagram of a motor system, according to various examples.

In the following detailed description, reference is made to the accompanying drawings, which form a part hereof, and in which are shown, by way of illustration, specific examples in which the present disclosure may be practiced. These examples are described in sufficient detail to enable a person of ordinary skill in the art to practice the present disclosure. However, other examples enabled herein may be utilized, and structural, material, and process changes may be made without departing from the scope of the disclosure.

The illustrations presented herein are not meant to be actual views of any particular method, system, device, or structure, but are merely idealized representations that are employed to describe the examples of the present disclosure. In some instances similar structures or components in the various drawings may retain the same or similar numbering for the convenience of the reader; however, the similarity in numbering does not necessarily mean that the structures or components are identical in size, composition, configuration, or any other property.

The following description may include examples to help enable one of ordinary skill in the art to practice the disclosed examples. The use of the terms "exemplary," "by example," and "for example," means that the related description is explanatory, and though the scope of the disclosure is intended to encompass the examples and legal equivalents, the use of such terms is not intended to limit the scope of an example or this disclosure to the specified components, steps, features, functions, or the like.

It will be readily understood that the components of the examples as generally described herein and illustrated in the drawings could be arranged and designed in a wide variety of different configurations. Thus, the following description of various examples is not intended to limit the scope of the present disclosure, but is merely representative of various examples. While the various aspects of the examples may be presented in the drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art will understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the examples disclosed herein may be implemented or performed with a general purpose processor, a special purpose processor, a digital signal processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer executes computing instructions (e.g., software code) related to examples of the present disclosure.

The examples may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, other structure, or combinations thereof. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may include one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

A constant brake current may be applied to an electric motor or a constant duty cycle may be applied to power switches of an inverter to slow or stop an electric motor. A constant duty cycle applied to the power switches of the inverter may substantially short-circuit phases of the motor and stop the motor. A motor phase current may not be controlled and may be a function of an applied duty cycle and a speed of the motor, which may operate as a generator during braking. Simplicity is an advantage of these approaches. These approaches, however may have a relatively low efficiency because a power factor is lower than unity due to the phase current not being sinusoidal. Also, these approaches may have relatively high operating noise associated therewith, especially in instances where the phase current is trapezoidal, which implies some audible noise during a braking phase. Regulation of current in these approaches may also be generally poor as a proportional-integral (PI) regulator may not be able to eliminate stationary error (steady-state error) in the case of varying signals (e.g., the phase current varies with the back electromagnetic force (BEMF) of the motor).

Constant brake current and constant duty cycle approaches may use six-step commutation motor control. In contrast, various examples disclosed herein may use field oriented control (FOC) of regenerative braking. Various examples disclosed herein may therefore provide relatively high efficiency since a power factor (μF) approaches unity and the conduction losses of a power inverter may be decreased (e.g., minimized). As a result, battery life may be increased as compared to constant brake current and duty cycle approaches. Also, various examples disclosed herein may have relatively low operating noise since the motor phase current is sinusoidal. In addition, various examples disclosed herein may provide improved riding comfort and an improved riding experience as the brake strength may be adjusted with vehicle and/or motor speed.

According to various examples, a method of implementing a regenerative brake for low-power e-mobility applications (e.g., electric scooters (e-scooters), electric bikes (e-bikes), and electric chairs (e-chairs) may be considered "low-power e-mobility applications," without limitation) that use FOC control as a motor control algorithm are disclosed. Various examples provide automatic brake strength adjustment with adjustments in motor and/or vehicle speed, reduced operating noise, and improved regeneration efficiency. Various examples disclosed herein are suitable for low power e-mobility solutions such as e-scooters and e-bikes where interactions between the motor driver and a human operator may be done using only a throttle key. In various examples no brake pedal may be available to control the regenerative brake strength.

Various examples disclosed herein are suitable to be implemented on any motor control solution that uses FOC as the control algorithm. The regenerative braking may be implemented by applying a negative torque current (Iq) to a motor. Due to the use of FOC the motor phase currents may be sinusoidal, and the power factor may approach unity. Operating noise may be relatively low. The value of the negative torque current may be adjusted as a function of motor and/or vehicle speed using interpolation tables (e.g., linear interpolation tables, which may be used to approximate a non-linear function to expend fewer computational resources than would be involved using non-linear interpolation).

In various examples some or all of the regenerative braking may be implemented using a microcontroller executing firmware. This firmware may use FOC as the control algorithm for the motor. The algorithm may be computationally intensive and may be implemented in general using microcontrollers with medium to high computational power. By way of non-limiting example, a medium computational power microcontroller may be a 16 or 32 bit microcontroller without a digital signal processing (DSP) core, without a high-speed core clock, or without a high million instructions per second (MIPS) metric. Also by way of non-limiting example, a high computational power microcontroller may be a 16 or 32 bit microcontroller with a DSP core, a high-speed core clock, or a high MIPS metric.

FOC uses a relatively precise measurement or estimation of the rotor position. This position may be measured using encoders, resolvers, or other high-resolution angle sensors.

This position may also be estimated using certain mathematical models of the motor (e.g., sensorless operation, without limitation), which may include measuring motor phase currents and providing the measured motor phase currents to a mathematical model of the motor to compute an estimate of the rotor angle. However, high-resolution angle sensors may be relatively expensive and the sensorless estimation of the rotor position may not be accurate at low speeds. Some motors used in low-cost e-mobility applications like e-scooters and e-bikes may be equipped with low-resolution angle sensors such as Hall position encoders. These motors may in general be controlled using simple six-steps control algorithms (e.g., using trapezoidal phase currents) where the resolution provided by the Hall sensors may be appropriate. However, by combining the information provided by the Hall sensors at low speeds with the information provided by angle observers at high speeds, it may be possible to use low-cost position encoders (e.g., 60 degree Hall sensors, without limitation) for implementing FOC and maintain the performance of the algorithm across a wide speed range. This firmware may use the Hall sensors to provide the rotor angle at low speeds and the angle observers to correct the rotor angle at high speeds.

To provide a high-resolution angle (e.g., greater than or equal to one degree resolution, without limitation) at low speed, the angle, as reported by the angle observers (e.g., Hall sensors, without limitation), is interpolated (e.g., using firmware based on information from the Hall sensors, without limitation). This technique is effective at low speed but provides poor results at high operating speed due to the limited resolution of the Hall sensors; that is, only six positions of the rotor are provided and in many cases the Hall sensors are not very accurately aligned with the real rotor position. Angle observers are more effective if the speed of the motor is over a certain threshold. The position offered by the angle observers is significantly more precise compared with the position measured by the Hall sensors. Angle observers may observe a back electromagnetic field (BEMF) of the motor. The BEMF of the motor is zero at zero speeds and may be low at low-speeds of the motor. The Hall sensors may be used to find the angle of the rotor. The firmware uses a non-linear angle observer.

A driver may spin the motor starting from rest in a sensored mode. In the sensored mode, Hall sensors or position encoders or resolvers may be used to track a position or speed of the motor. In a sensorless mode angle observers may be used to track a position or speed of the motor. However, in the sensored mode, an algorithm controls a driver to apply six-step trapezoidal commutation if the measured speed is below a minimum threshold, where the angle interpolation is not accurate. After this minimum threshold, the control algorithm will switch to full interpolation angle mode. The firmware will switch automatically to six-step commutation if the speed is below the minimum threshold or the motor is stalled and the angle interpolation is not possible anymore. There may be a timer implemented in the firmware that monitors the transitions of the Hall sensor outputs. The value of this timeout timer may be adjustable. An example of a start-up in sensored mode is presented in FIG. 2.

FIG. 1 is a functional flow diagram of a motor system 100, according to various examples. The motor system 100 includes a controller 104, a motor 108, one or more sensors 126 (e.g., a Hall effect sensor, an encoder, a resolver, without limitation), and a user interface 136. The controller 104 includes an input terminal 106 to receive, from the one or more sensors 126, a signal 130 indicating a speed 132 of the motor 108 and an angle 134 of the motor 108. The controller 104 also includes one or more data storage devices 140 and a processing core 144. The processing core 144 includes one or more angle observers 146, an angle/speed block 122, a regenerative brake current interpolator 102, a motoring/brake block 114, a torque PI controller 110, a flux PI controller 112, an inverse Clark/Park transform 118, a direct Clark/Park transform 120, and a space vector modulation (SVM) pulse width modulation (PWM) block (SVM/PWM block 116). The angle observers 146 may also provide the signal 130 indicating the speed 132 and the angle 134 to the angle/speed block 122 instead of, or in addition to the one or more sensors 126. The processing core 144 determines a braking current 124 responsive to the speed 132 of the motor 108 based, at least in part on braking current data 142 stored on the one or more data storage devices 140. The terms "braking current" (e.g., the braking current 124 of FIG. 1) and "regenerative brake current" are used interchangeably herein. The processing core 144 may also control operation of the motor 108 responsive to the determined braking current 124.

The angle/speed block 122 provides the speed 132 and an angle 134 of the motor 108 responsive to the signal 130. In some examples the signal 130 directly indicates the speed 132 and the angle 134. In some examples, however, the signal 130 may not directly indicate the speed 132 and the angle 134, but the angle/speed block 122 may determine the speed 132 and the angle 134 based, at least in part, on the signal 130. The angle/speed block 122 delivers the speed 132 to the regenerative brake current interpolator 102 and the angle 134 to the inverse Clark/Park transform 118 and the direct Clark/Park transform 120.

The regenerative brake current interpolator 102 receives the speed 132 from the angle/speed block 122. The regenerative brake current interpolator 102 determines a value of the braking current 124 to be applied to the motor 108 at least partially responsive to the speed 132 received from the angle/speed block 122. The regenerative brake current interpolator 102 varies a value of the braking current 124 with variation of the speed 132 of the motor 108. Accordingly, values of the braking current 124 vary with variation of the speed 132 of the motor 108. The regenerative brake current interpolator 102 provides a value (e.g., a digital value or a digital signal proportional to the determined braking current, said value or signal processed within a firmware operation, without limitation) indicating the braking current 124 to the motoring/brake block 114. In some examples the braking current 124 indicates a negative torque current.

The one or more data storage devices 140 include braking current data 142 stored thereon. By way of non-limiting example, the regenerative brake current interpolator 102 may use the braking current data 142 stored by the data storage devices 140 along with the speed 132 to determine the braking current 124. The braking current data 142 includes braking current values CURR. 1, CURR. 2, . . . , CURR. N, respectively, for a plurality of different speed values SPEED 1, SPEED 2, . . . , SPEED N of the motor 108. The braking current values CURR. 1, CURR. 2, . . . , CURR. N vary for varying values of the plurality of different speeds SPEED 1, SPEED 2, . . . , SPEED N. The value of the braking current 124 may be one of the braking current values CURR. 1, CURR. 2, . . . , CURR. N that corresponds to the speed 132 detected by the sensors 126 or the angle observers 146. The regenerative brake current interpolator 102 may use interpolation (e.g., linear interpolation, non-linear interpolation, without limitation) to determine values for the braking current 124 when the speed 132 is between two of the speed values SPEED 1, SPEED 2, . . . , SPEED N stored as braking current data 142 by the data storage devices 140. Accordingly, the current value indicated by the braking current 124 may be between two of the current values CURR. 1, CURR. 2, . . . , CURR. N stored as braking current data 142 by the data storage devices 140. In some examples a relationship of the braking current values CURR. 1, CURR. 2, . . . , CURR. N to the values of the plurality of different speeds SPEED 1, SPEED 2, . . . , SPEED N may be expressed or estimated as a function (e.g., a non-linear function, a linear function, without limitation). In such examples the braking current data 142 may instead include information indicating the function, and the regenerative brake current interpolator may determine the braking current 124 responsive to the speed 132 and the function indicated by the braking current data 142.

In some examples the value of the braking current 124 is determined responsive to one or more interpolation tables (e.g., stored as the braking current data 142, which may amount to programming the brake current as a function of the motor speed). The use of tables and interpolation may be less computationally intensive than calculating the brake current in terms of a mathematical relationship between motor speed and braking current. By way of non-limiting example, the value of the braking current 124 (e.g., the braking current values CURR. 1, CURR. 2, . . . , CURR. N, without limitation) varies non-linearly with the variation of the speed 132 (as per the plurality of different speeds SPEED 1, SPEED 2, . . . , SPEED N) of the motor 108. In some examples the controller 104 controls the motor 108 using field oriented control (FOC). In some examples phase currents of the motor are sinusoidal.

In some examples the sensors 126 include Hall effect sensors to detect the speed 132 of the motor 108. By way of non-limiting example, the controller 104 may control the motor 108 using Hall position encoders (e.g., Hall effect sensors of the sensors 126) responsive to the detected speed 132 of the motor 108 being below a predetermined minimum threshold. The controller 104 may control the motor 108 using the angle observers 146 responsive to the indicated speed 132 of the motor 108 being over the predetermined minimum threshold.

In operation, three current values Ia, Ib, and Ic may be measured (e.g., using three shunt resistors, Hall effect sensors, specialized current sensors (e.g., Rogowski coils), without limitation) from the motor 108. The current values Ia, Ib, and Ic may be phase currents of the motor 108. By way of non-limiting example, the motor 108 may be a three-phase motor. Also by way of non-limiting example, the motor 108 may be a brushless direct current motor. The three current values Ia, Ib, and Ic may be provided to the direct Clark/Park transform 120 and to the angle observers 146. The angle observers 146 generate the signal 130 responsive to the three current values Ia, Ib, and Ic. The angle observers 146 may include mathematical models used to estimate the speed, the angle, or both the speed and the angle of the motor 108 responsive to a specific equation relating the BEMF voltage of the motor 108 to the three currents Ia, Ib, and Ic (phase currents) and motor parameters. Also, as indicated above, the angle 134 may be provided to the inverse Clark/Park transform 118 and the direct Clark/Park transform 120, and the speed 132 may be provided to the regenerative brake current interpolator 102. The user interface 136 may provide a signal indicating a motoring current 128 to the motoring/brake block 114. The motoring current is indicative of a desired speed for the motor 108 to spin in a forward direction.

The motoring/brake block 114 may be a decision block to determine whether the motoring current 128 or the braking current 124 should be provided to the torque PI controller 110. The motoring/brake block 114 may be controlled responsive to a direction or position that the throttle input device 138 (e.g., a throttle switch, without limitation) is moved by a user of the motor system 100. By way of non-limiting example, if the throttle input device 138 is moved to an accelerate direction or position the motoring/brake block 114 may provide the motoring current 128 to the torque PI controller 110, and if the throttle input device 138 is moved to a braking direction or position the motoring/brake block 114 may provide the braking current 124 to the torque PI controller 110. The provided one of the braking current 124 or motoring current 128 may serve as a setpoint for the torque PI controller 110. Accordingly, the motoring and braking currents are controlled using the torque PI controller 110. A zero value may be provided as a reference setpoint to the flux PI controller 112. During motoring (e.g., acceleration) the reference setpoint of the torque PI controller 110 is set to the motoring current 128. During regenerative braking the reference setpoint of the torque PI controller 110 is set to the braking current 124.

The direct Clark/Park transform 120 transforms the current values Ia, Tb, and Ic, which may be sinusoidal currents, into Id and Iq, which are direct current (DC) currents. DC current Id may be a real component of a motor phase current and Iq may be an imaginary (reactive) component of the motor phase current. The DC currents Id and Iq may be used by the proportional integral (PI) controllers flux PI controller 112 and torque PI controller 110, respectively. The flux PI controller 112 may minimize the flux component (the reference setpoint of the flux PI controller 112 may be set to zero) and the torque component may be set to Iq from motoring/brake block 114. The flux PI controller 112 and the torque PI controller 110 provide DC voltage potentials Vd and Vq, respectively, which correspond to real and imaginary components, respectively, to the inverse Clark/Park transform 118.

The inverse Clark/Park transform 118 provides three voltage potential signals Va, Vb, and Vc, which are sinusoidal, to the SVM/PWM block 116 to control the motor 108 responsive to the DC voltage potentials Vq and Vd. The sinusoidal voltage potential signals Va, Vb, and Vc may also be provided to a power inverter (not shown, e.g., a six-switch power inverter, without limitation) between the SVM/PWM block 116 and the motor 108. The power inverter may drive the motor 108 responsive to switching signals provided by the SVM/PWM block 116.

Figure 2:
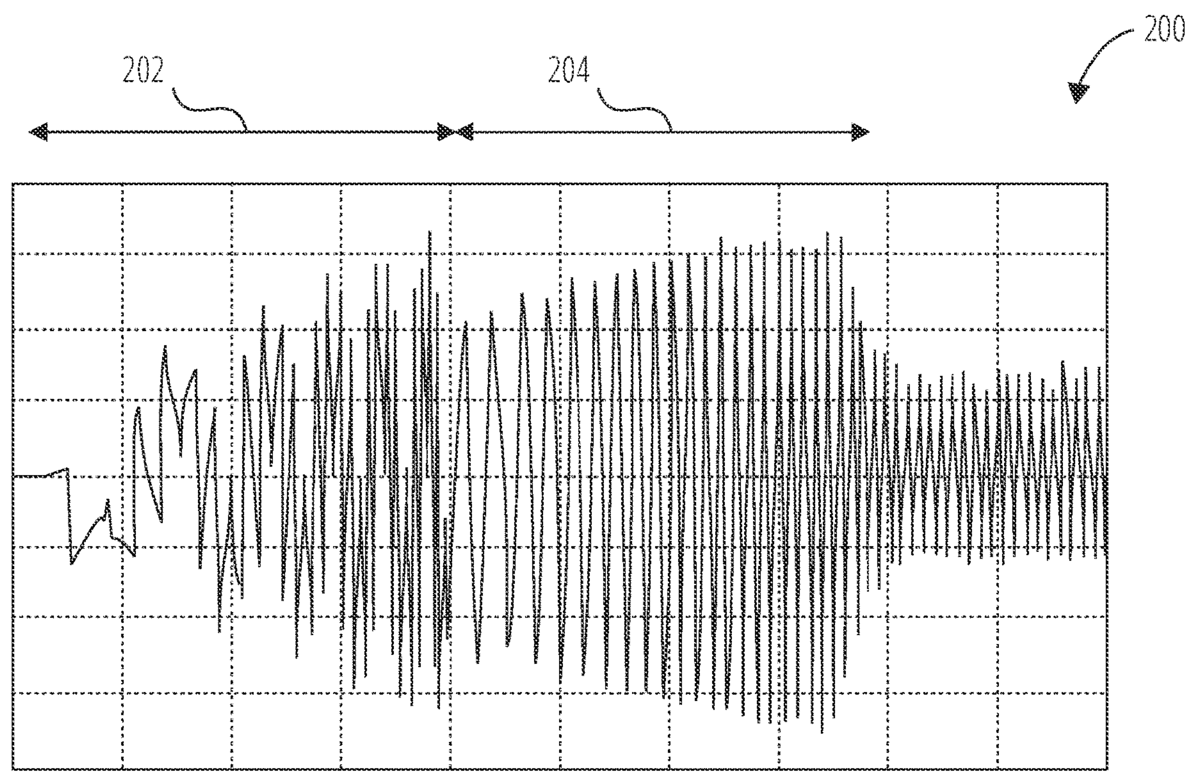
FIG. 2 is a plot illustrating a phase current during a start-up in a sensor mode according to various examples.

FIG. 2 is a plot illustrating a phase current 200 during a start-up in a sensor mode. A horizontal axis of the plot of FIG. 2 is for time, and a vertical axis of the plot is for voltage potential. During a first period of time 202 the phase current 200 reflects six-step commutation. During a second period of time 204 the phase current 200 reflects sinusoidal commutation.

Figure 3:
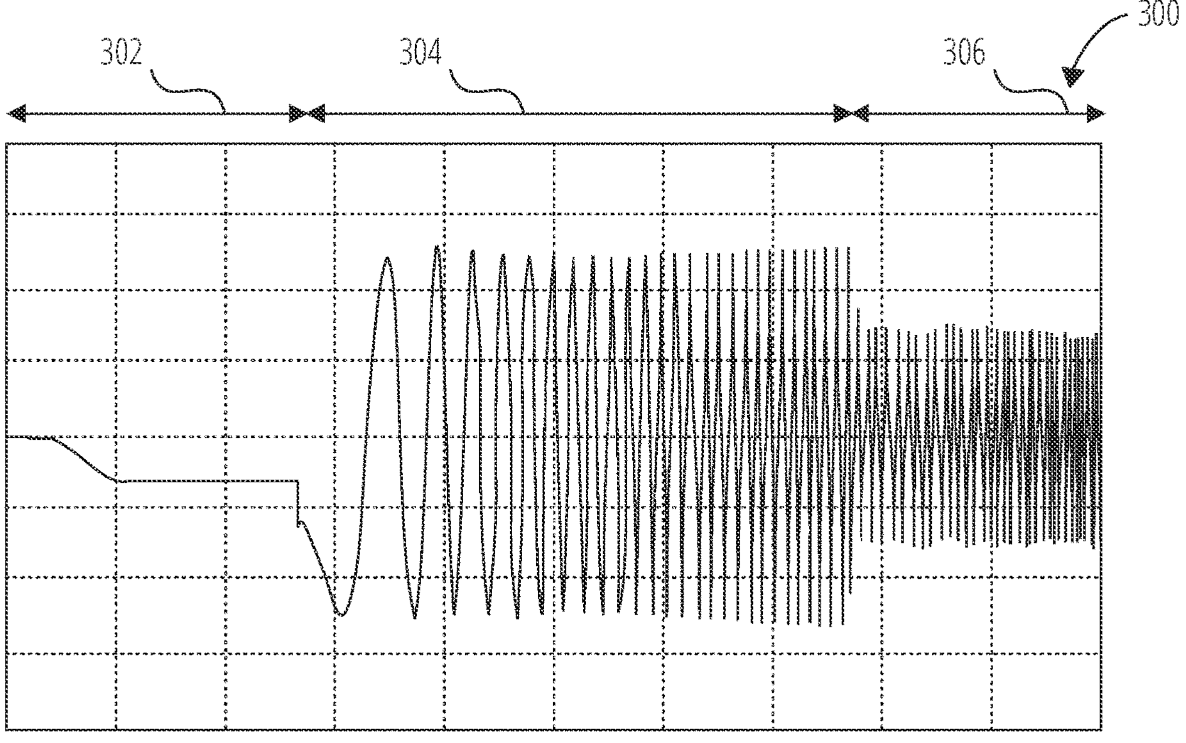
FIG. 3 is a plot illustrating a phase current during a start-up in a sensorless mode according to various examples.

FIG. 3 is a plot illustrating a phase current 300 during a start-up in a sensorless mode. There are three phases of operation illustrated for the phase current 300 of FIG. 3: a rotor alignment phase 302 where the phase current is forced to a stationary value (e.g., a DC value) and as a result the rotor will be aligned to the closest equilibrium position; an open-loop acceleration phase 304 where the motor 108 (FIG. 1) is accelerated to a minimum speed, and a closed-loop phase 306 where the rotor angle is provided by the angle observer (e.g., the angle observers 146 of FIG. 1).

Some e-scooters use only a throttle key (e.g., including a potentiometer, without limitation) as the interface (e.g., the user interface 136 of FIG. 1) between the user and the motor driver. The potentiometer/throttle key (e.g., the throttle input device 138 of FIG. 1), which may be manipulated by a human operator, provides a linear voltage (e.g., indicative of a motoring current 128 of FIG. 1, without limitation), which is used by the torque PI controller 110 to adjust the speed or the torque current depending on an operating mode (e.g., a "constant speed mode") where the torque PI controller 110 will try to keep the speed of the motor constant regardless of the load conditions and a "constant torque mode" where the torque PI controller 110 will keep constant the torque current of the motor and the speed will vary according with the load conditions. Firmware executed by the processing core 144 provides support for the potentiometer/throttle key and this may, in some instances, be the only user interface. No additional buttons or communication interfaces are implemented because the throttle input device 138 may be used to indicate a desired acceleration or a desired braking. To use the potentiometer/throttle key, a programmer (e.g., a firmware designer) of the motor system 100 may define low and high voltage levels.

Figure 4:
FIG. 4 is a plot illustrating an example of values of a speed of an electric scooter.
Figure 4:
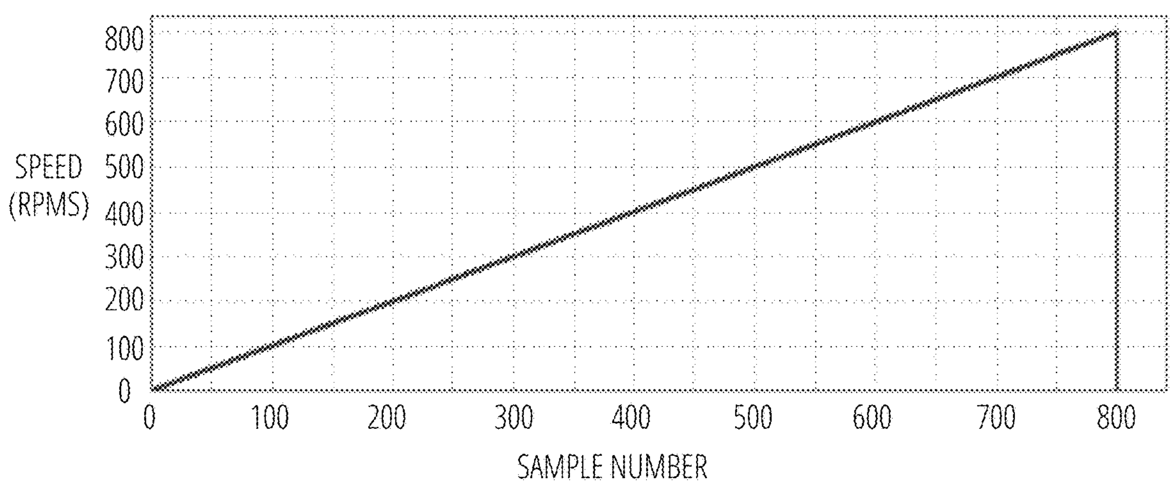
Figure 5:
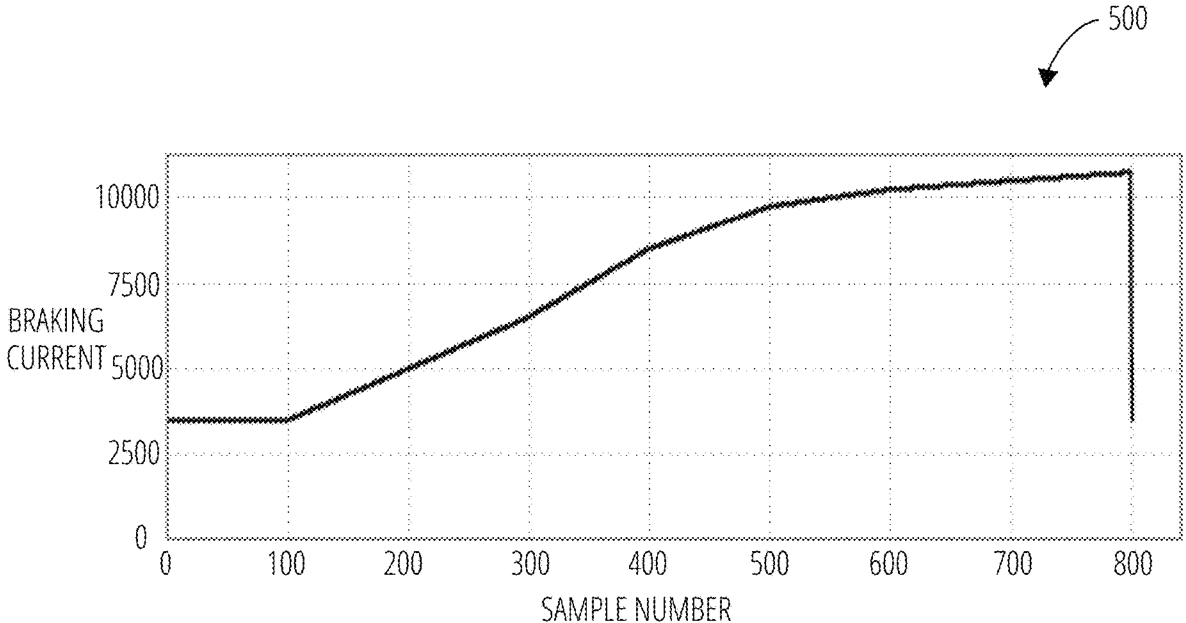
FIG. 5 is a plot illustrating values of an interpolated current that may be provided at corresponding values of the speed of the electric scooter of FIG. 4.

The current profile is non-linear but provides a comfortable braking response across the entire range of speeds. FIG. 4 and FIG. 5 present the interpolated regenerative braking current (FIG. 5) versus the speed (FIG. 4).

FIG. 4 is a plot illustrating an example of values of a speed 400 of an electric scooter. A vertical axis of the plot represents motor speed 400 (in rotations per minute (RPMs)) and the horizontal axis indicates a sample number (e.g., 800 samples illustrated in FIG. 4).

FIG. 5 is a plot illustrating values of an interpolated regenerative braking current 500 that should be provided at corresponding values of the speed 400 of FIG. 4. The vertical axis represents the regenerative braking current 500 and the horizontal axis represents the sample numbers. The deceleration ramp is steeper, braking distance is shorter but, in this case, the braking at lower speeds becomes uncomfortable.

Figure 6:
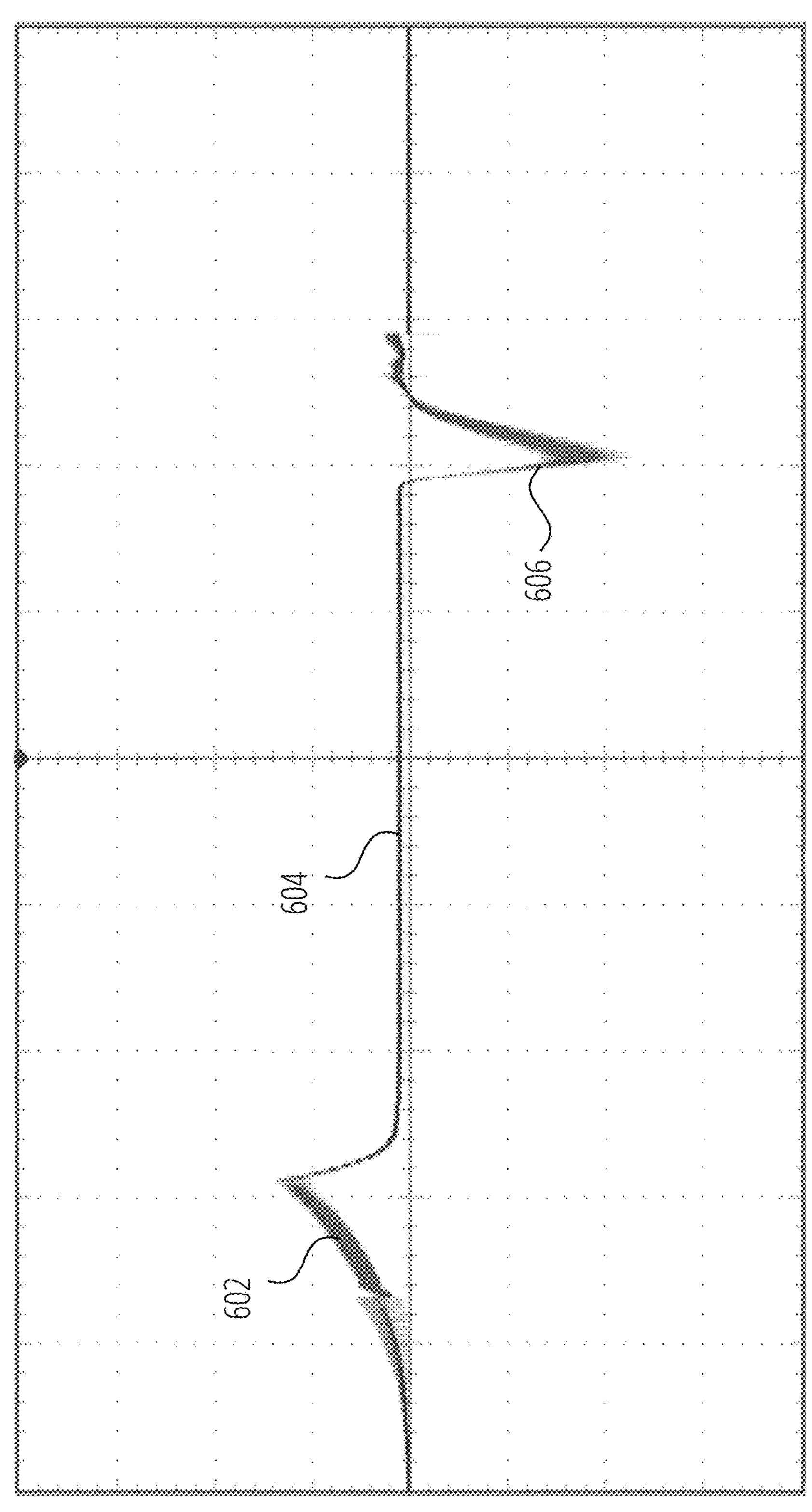
FIG. 6 is a plot illustrating an example of input current during acceleration, constant speed running, and regenerative brake.

FIG. 6 is a plot illustrating an example of input current 600 during acceleration 602, constant speed 604 running, and regenerative brake 606. The voltage is supplied by a 10S/7500 mA Li-Ion battery during this test. The area under the curve of input current 600 during acceleration 602 and regenerative brake 606 phases is a measure of the energy delivered to the motor (e.g., the motor 108 of FIG. 1) and recovered from the motor, respectively. These areas should be substantially equal for an efficient regenerative braking system.

Figure 7:
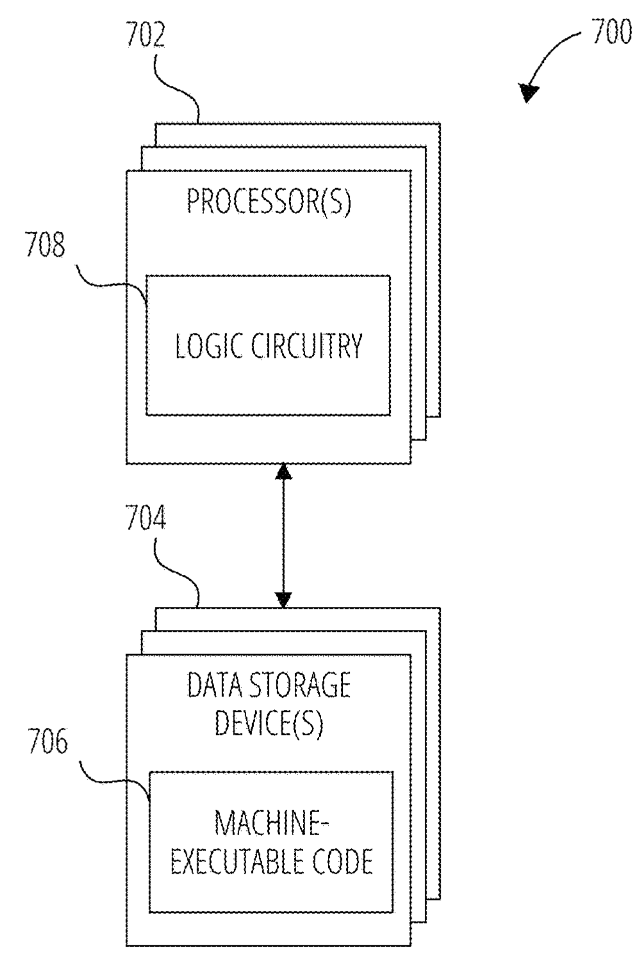
FIG. 7 is a block diagram of circuitry that, in some examples, may be used to implement various functions, operations, acts, processes, and/or methods of various examples.

It will be appreciated by those of ordinary skill in the art that functional elements of examples disclosed herein (e.g., functions, operations, acts, processes, and/or methods) may be implemented in any suitable hardware, software, firmware, or combinations thereof. FIG. 7 illustrates non-limiting examples of implementations of functional elements disclosed herein. In some examples, some or all portions of the functional elements disclosed herein may be performed by hardware specially designed for carrying out the functional elements.

FIG. 7 is a block diagram of circuitry 700 that, in some examples, may be used to implement various functions, operations, acts, processes, and/or methods disclosed herein. The circuitry 700 includes one or more processors 702 (sometimes referred to herein as "processors 702") operably coupled to one or more data storage devices (sometimes referred to herein as "storage 704"). The storage 704 includes machine-executable code 706 stored thereon and the processors 702 include logic circuitry 708. The machine-executable code 706 includes information describing functional elements that may be implemented by (e.g., performed by) the logic circuitry 708. The logic circuitry 708 is adapted to implement (e.g., perform) the functional elements described by the machine-executable code 706. The circuitry 700, when executing the functional elements described by the machine-executable code 706, should be considered as special purpose hardware designed for carrying out functional elements disclosed herein. In some examples the processors 702 may perform the functional elements described by the machine-executable code 706 sequentially, concurrently (e.g., on one or more different hardware platforms), or in one or more parallel process streams.

When implemented by logic circuitry 708 of the processors 702, the machine-executable code 706 is to adapt the processors 702 to perform operations of examples disclosed herein. For example, the machine-executable code 706 may be to adapt the processors 702 to perform at least a portion or a totality of the operations discussed for the controller 104 of FIG. 1. As a specific, non-limiting example, the machine-executable code 706 may be to adapt the processors 702 to control a brake current for a regenerative brake of a motor to vary with variations of a speed of a motor.

The processors 702 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer is to execute functional elements corresponding to the machine-executable code 706 (e.g., software code, firmware code, hardware descriptions) related to examples of the present disclosure. It is noted that a general-purpose processor (may also be referred to herein as a host processor or simply a host) may be a microprocessor, but in the alternative, the processors 702 may include any conventional processor, controller, microcontroller, or state machine. The processors 702 may also be implemented as a combination of computing devices, such as a combination of a DSP and a microprocessor, a plurality of microprocessors, one or more microprocessors in conjunction with a DSP core, or any other such configuration.

In some examples the storage 704 includes volatile data storage (e.g., random-access memory (RAM)), non-volatile data storage (e.g., Flash memory, a hard disc drive, a solid state drive, erasable programmable read-only memory (EPROM), without limitation). In some examples the processors 702 and the storage 704 may be implemented into a single device (e.g., a semiconductor device product, a system on chip (SOC), without limitation). In some examples the processors 702 and the storage 704 may be implemented into separate devices.

In some examples the machine-executable code 706 may include computer-readable instructions (e.g., software code, firmware code). By way of non-limiting example, the computer-readable instructions may be stored by the storage 704, accessed directly by the processors 702, and executed by the processors 702 using at least the logic circuitry 708. Also by way of non-limiting example, the computer-readable instructions may be stored on the storage 704, transferred to a memory device (not shown) for execution, and executed by the processors 702 using at least the logic circuitry 708. Accordingly, in some examples the logic circuitry 708 includes electrically configurable logic circuitry 708.

In some examples the machine-executable code 706 may describe hardware (e.g., circuitry) to be implemented in the logic circuitry 708 to perform the functional elements. This hardware may be described at any of a variety of levels of abstraction, from low-level transistor layouts to high-level description languages. At a high-level of abstraction, a hardware description language (HDL) such as an IEEE Standard hardware description language (HDL) may be used. By way of non-limiting examples, Verilog™, SystemVerilog™ or very large scale integration (VLSI) hardware description language (VHDL™) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of the logic circuitry 708 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in some examples the machine-executable code 706 may include an HDL, an RTL, a GL description, a mask level description, other hardware description, or any combination thereof.

In examples where the machine-executable code 706 includes a hardware description (at any level of abstraction), a system (not shown, but including the storage 704) may be to implement the hardware description described by the machine-executable code 706. By way of non-limiting example, the processors 702 may include a programmable logic device (e.g., an FPGA or a PLC) and the logic circuitry 708 may be electrically controlled to implement circuitry corresponding to the hardware description into the logic circuitry 708. Also by way of non-limiting example, the logic circuitry 708 may include hard-wired logic manufactured by a manufacturing system (not shown, but including the storage 704) according to the hardware description of the machine-executable code 706.

Regardless of whether the machine-executable code 706 includes computer-readable instructions or a hardware description, the logic circuitry 708 is adapted to perform the functional elements described by the machine-executable code 706 when implementing the functional elements of the machine-executable code 706. It is noted that although a hardware description may not directly describe functional elements, a hardware description indirectly describes functional elements that the hardware elements described by the hardware description are capable of performing.

Figure 8:
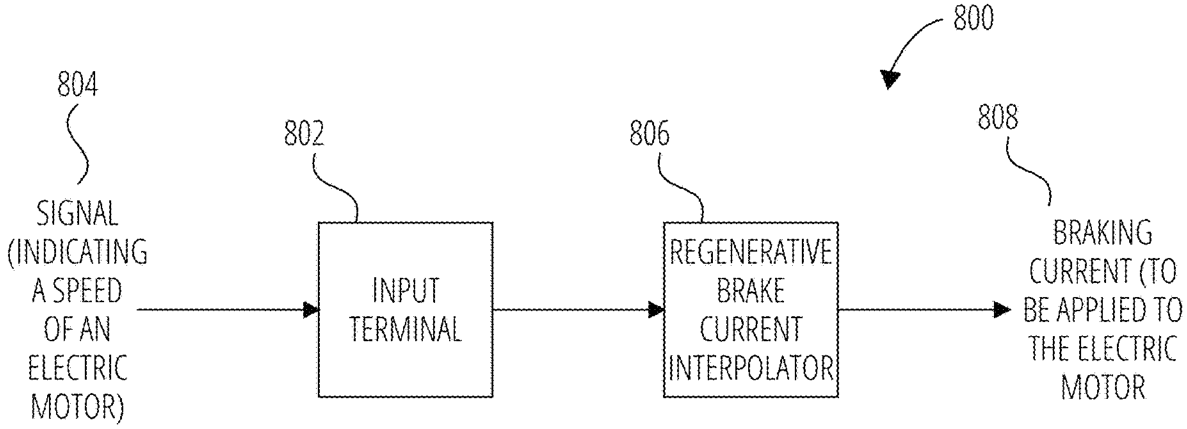
FIG. 8 is a block diagram of an apparatus, according to some examples.

FIG. 8 is a block diagram of an apparatus 800, according to some examples. The apparatus 800 includes an input terminal 802 to receive a signal 804 indicating a speed of an electric motor. The apparatus 800 also includes a regenerative brake current interpolator 806 to indicate a braking current 808 to be applied to the electric motor responsive to the speed of the electric motor. A value of the braking current 808 varies with variation of the speed of the electric motor.

EXAMPLES

A non-exhaustive, non-limiting list of examples follows. Not each of the examples listed below is explicitly and individually indicated as being combinable with all others of the examples listed below and examples discussed above. It is intended, however, that these examples are combinable with all other examples unless it would be apparent to one of ordinary skill in the art that the examples are not combinable.

Example 1: An apparatus including an input terminal and a regenerative brake current interpolator. The input terminal is to receive a signal indicating a speed of an electric motor. The regenerative brake current interpolator is to indicate a braking current to be applied to the electric motor responsive to the speed of the electric motor, a value of the braking current varying with variation of the speed of the electric motor.

Example 2: The apparatus of Example 1, wherein the value of the braking current varies non-linearly with the variation of the speed of the electric motor.

Example 3: The apparatus according to any one of Examples 1 and 2, wherein the value of the braking current is determined responsive to one or more linear interpolation tables including values of speeds of the electric motor and corresponding values of braking currents.

Example 4: The apparatus according to any one of Examples 1-3, wherein the braking current includes a negative torque current.

Example 5: The apparatus according to any one of Examples 1-4, wherein the apparatus is a controller to control the electric motor using high-resolution angle observers responsive to an indicated speed of the electric motor being over a predetermined threshold.

Example 6: The apparatus according to any one of Example 1-5, wherein the apparatus is a controller to control the electric motor using an encoder responsive to a detected speed of the electric motor below a predetermined threshold.

Example 7: The apparatus according to any one of Examples 1-6, wherein phase currents of the electric motor are sinusoidal.

Example 8: An apparatus including one or more data storage devices and a processing core. The one or more data storage devices include braking current data stored thereon. The braking current data includes respective braking current values for a plurality of different speeds of an electric motor. The braking current values vary for varying values of the plurality of different speeds.

Example 9: The apparatus of Example 8, wherein the braking current values vary as a non-linear function of the plurality of different speeds.

Example 10: The apparatus according to any one of Examples 8 and 9, wherein the determined braking current includes a negative torque current.

Example 11: A motor system including an electric motor and a controller to vary a braking current provided to the electric motor as a function of a speed of the electric motor.

Example 12: The motor system of Example 11, wherein the controller is to vary the braking current provided to the electric motor responsive to linear interpolation tables including values of speeds of the electric motor and corresponding values of braking currents.

Example 13: The motor system according to any one of Examples 11 and 12, wherein the controller is to vary the braking current provided to the electric motor as a non-linear function of the speed of the electric motor.

Example 14: The motor system according to any one of Examples 11-13, comprising a Hall effect sensor to detect the speed of the electric motor and provide a signal indicating the speed of the electric motor.

Example 15: The motor system according to any one of Examples 11-14, comprising a user interface including a throttle input device.

Example 16: The motor system according to any one of Examples 11-15, wherein the controller is to control regenerative braking of the electric motor using field oriented control.

Example 17: The motor system according to any one of Examples 11-16, including a Hall position encoder and an angle observer. The controller is to control regenerative braking of the electric motor using the Hall position encoder or the angle observer responsive to the speed of the electric motor.

CONCLUSION

As used in the present disclosure, the terms "module" or "component" may refer to specific hardware implementations to perform the actions of the module or component and/or software objects or software routines that may be stored on and/or executed by general purpose hardware (e.g., computer-readable media, processing devices, without limitation) of the computing system. In some examples, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

As used in the present disclosure, the term "combination" with reference to a plurality of elements may include a combination of all the elements or any of various different sub-combinations of some of the elements. For example, the phrase "A, B, C, D, or combinations thereof" may refer to any one of A, B, C, or D; the combination of each of A, B, C, and D; and any sub-combination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," without limitation).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, without limitation" or "one or more of A, B, and C, without limitation" is used, in general such a construction is intended to include A alone, B alone, C alone, A and B together, A and C together, B and C together, or A, B, and C together, without limitation.

Also, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

While the present disclosure has been described herein with respect to certain illustrated examples, those of ordinary skill in the art will recognize and appreciate that the present invention is not so limited. Rather, many additions, deletions, and modifications to the illustrated and described examples may be made without departing from the scope of the invention as hereinafter claimed along with their legal equivalents. In addition, features from one example may be combined with features of another example while still being encompassed within the scope of the invention as contemplated by the inventor.

What is claimed is:

1. An apparatus, comprising:

a controller comprising computer-executable code tangibly embodied on a non-transitory computer readable medium operable to implement field-oriented control (FOC) of an electric motor, the computer-executable code operable to include:

a regenerative brake current interpolator to determine a braking current to be applied to the electric motor responsive to a speed of the electric motor and braking current data stored as one or more interpolation tables including programmed values of speeds of the electric motor and corresponding values of braking currents, the regenerative brake current interpolator varying values of the braking current non-linearly with respective varying values of the speed of the electric motor, wherein the controller is operable to apply the determined braking current to the electric motor as a negative quadrature current within the FOC implemented by the controller.

2. The apparatus of claim 1, wherein the value of the braking current varies non-linearly with the variation of the speed of the electric motor.

3. The apparatus of claim 1, wherein the value of the braking current is determined responsive to the braking current data stored as one or more linear interpolation tables including programmed values of speeds of the electric motor as a function of corresponding values of braking currents.

4. The apparatus of claim 1, comprising a number of Hall effect sensors, wherein the computer-executable code is operable to detect the speed of the electric motor utilizing one or more of the Hall effect sensors.

5. The apparatus of claim 4, comprising one or more Hall position encoders, wherein the computer-executable code is configured to control the electric motor utilizing the one or more Hall position encoders to control the electric motor responsive to the detected speed of the electric motor below a predetermined minimum threshold.

6. The apparatus of claim 1, wherein the computer-executable code is operable to implement one or more non-linear angle observers to control the electric motor responsive to the detected speed of the electric motor being over a predetermined minimum threshold.

7. The apparatus of claim 1, comprising:

a throttle key to provide a linear voltage indicative of a motoring current;

wherein the computer-executable code is configured to:

implement a torque proportional integral (PI) controller to utilize the linear voltage to adjust the speed of the electric motor based in part on the motoring current and an operating mode, wherein the operating mode is one of a constant speed mode and a constant torque mode; and enable the throttle key through defining high and low voltages.

8. The apparatus of claim 7, wherein responsive to a constant speed operating mode, the speed of the motor is constant and load-independent.

9. The apparatus of claim 7, wherein responsive to a constant torque operating mode the torque current is constant and the speed of the motor is variable and load dependent.

10. The apparatus of claim 1, comprising a driver, wherein the computer-executable code is configured to operate the driver in one of a sensor mode or a sensorless mode.

11. The apparatus of claim 1, where phase currents of the motor are sinusoidal.

12. An apparatus, comprising:

one or more data storage devices including braking current data stored thereon, the braking current data including one or more interpolation tables including programmed values of speeds of an electric motor and corresponding values of braking currents, wherein the corresponding values of braking current vary as a non-linear function of the plurality of different speeds; and a processing core to:

implement field-oriented control (FOC) of the electric motor, the processing core operable to determine a braking current to be applied to the electric motor responsive to a speed of the electric motor based, at least in part, on the braking current data; and apply the determined braking current to the electric motor as a negative quadrature current within the FOC implemented by the processing core.

13. The apparatus of claim 12, wherein the determined braking current includes a negative torque current.

14. A motor system, comprising:

an electric motor; and a controller to implement field-oriented control (FOC) of the electric motor, the controller operable to:

determine a braking current to be applied to the electric motor responsive to a speed of the electric motor based, at least in part, on braking current data stored as one or more interpolation tables including programmed values of speeds of the electric motor and corresponding values of the braking current, the controller varying values of the braking current non-linearly with respective varying values of the speed of the electric motor; and apply the determined braking current to the electric motor as a negative quadrature current within the FOC implemented by the controller.

15. The motor system of claim 14, wherein the controller to vary the braking current provided to the electric motor responsive to linear interpolation tables including values of speeds of the electric motor and corresponding values of braking currents.

16. The motor system of claim 14, wherein the controller is to vary the braking current provided to the electric motor as a non-linear function of the speed of the electric motor.

17. The motor system of claim 14, comprising a Hall effect sensor to detect the speed of the electric motor and provide a signal indicating the speed of the electric motor.

18. The motor system of claim 14, comprising a driver, wherein an interface to the driver is a throttle input device.

19. The motor system of claim 14, wherein the controller is to control regenerative braking of the electric motor using field oriented control.

20. The motor system of claim 14, comprising:

a Hall position encoder; and an angle observer, wherein the controller to control regenerative braking of the electric motor using one of the Hall position encoder or the angle observer responsive to the speed of the electric motor.

21. The apparatus of claim 1, wherein the braking current is a negative torque current.

* * * * *